H. Pepper,
Making Staves,
Nº 1,313.
Patented Sep. 3, 1839.

UNITED STATES PATENT OFFICE.

HART PEPPER, OF SOUTHWICK, MASSACHUSETTS.

MACHINE FOR SAWING STAVES.

Specification of Letters Patent No. 1,313, dated September 3, 1839.

*To all whom it may concern:*

Be it known that I, HART PEPPER, of Southwick, in the county of Hampden and State of Massachusetts, have invented a new and Improved Mode of Sawing Bilged Staves of All Sizes, by the Use of Two Saws of the Form of a Truncated Paraboloid, and that the following is a full and exact description thereof.

The nature of my invention consists in the application of two saws in the form of truncated paraboloids, both of which commence sawing at each end of a block of timber at the same time, and moving in a circular manner, meet in the center and, after jointing the edges, forming a perfect stave, the surface corresponding exactly with the surface of a well made cask.

To enable others skilled in the art to make and use my invention I will proceed to describe its construction and operation, reference being had to the accompanying drawings in which—

Figure 2:
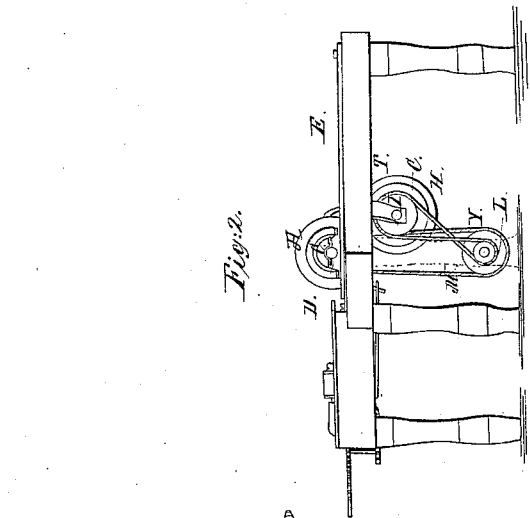
Figure 1:
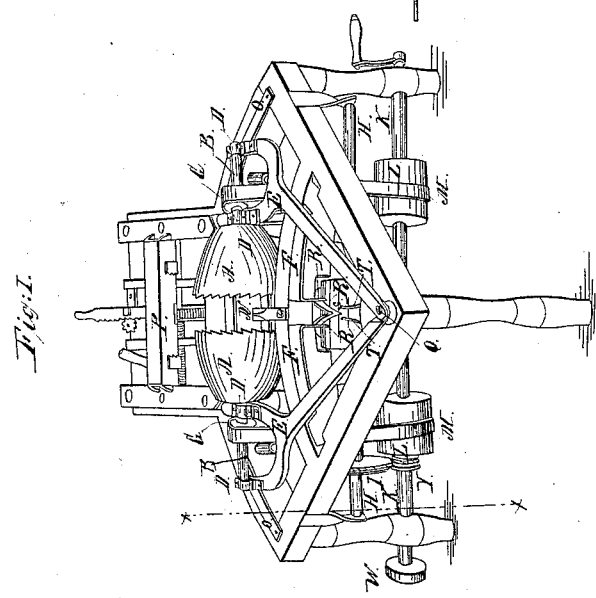
Figure 3:
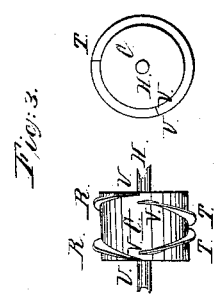

Figure 1, is a perspective view of the machine; Fig. 2, vertical section at the line *x x* of Fig. 1; and Fig. 3 is a section of the cam wheel, the same letters referring to similar parts in all the figures in which they are represented.

I construct the machinery connected with the saws in the manner indicated in the accompanying drawing.

That part of the drawing marked A A represents the two saws, which are in the form of a truncated paraboloid, in their structure, each saw being long enough to receive one-half the length of the stave and enlarged at the mouth sufficient to give the proper bilge to the stave, thereby forming a true circle, and the surface of the saw conforming exactly to the circle which the sweeps may give, and connected with the shafts B B to which are attached the pulleys G G by which pulleys the saws are propelled.

D D D D are the boxes through which the shafts run.

E E are the sweeps or carriages to which the boxes containing the shafts are attached, which sweeps or carriages extend to Q, which point is the center of a circle of which the sweeps are radii.

F F are hooks which run horizontally from the sweeps to points over the wedge cam wheel marked C, where they are bent and fall perpendicular toward the cam wheel.

The drawing represents a machine ready for, but not in operation, and the saws removed a little outwardly of their central position when operating. When the machine is in operation the hooks come in contact with the flanges R R or T T and at the ends of each with both passing on the outside of R R and the inside of T T. Said flanges or cams marked R R which project from the wheel C, and are secured firmly thereto and placed in such form as to have the effect of a wedge or screw begin at the point S, and extend one-third the circumference of the wheel, and spread sufficient to move the saws their proper distance apart to the point where the operation of sawing commences, from thence continue the two other cams or flanges marked T T the remaining two-thirds of the circumference of the wheel, and contracting around to the starting point S, where the saws are brought so nearly in contact as to finish the operation of sawing the stave, at which time the hooks pass on to R R and prevent the saws coming together.

U is one end of one of the retracing flanges R R and V an end of one of the retracing flanges T T. The outward motion of the saws is regulated by the flanges R R and the inward motion by the flanges T T and both are produced by one revolution of the wheel C, the outward motion being one-third quicker than the inward motion.

H is the shaft of the cam wheel.

K K is the main shaft to which is attached the drums or pulleys L L, around which pass the belts M M to and around pulleys G G, attached to the shaft carrying the saws and producing the rotary motion of the saws. A belt passes around and from a pulley Y on the main shaft to and around a pulley I, which is attached to shaft H.

Upon the main shaft is a pulley marked W, by which and by a belt passing around it and off in a direction to connect with the propelling power, the whole machine is set in motion.

N is a pan extended inside of the saws long enough to support the staves, made to conform to the inward surface of the saws; at the middle is an iron strap, passing between the teeth of the saws, in the little opening on that side, and so constructed as not to interfere with them and attached to the circular beam outside, supporting the pan so as to receive the staves as they are sawed from the block and protecting the pan and staves from coming in contact with the saws. The staves are taken from the pan as occasion may require.

O O are circular plates secured in a horizontal position upon the upper surface of the circular beam, on which the sweeps move; on the under side of the sweeps are attached plates of iron projecting under the circular plates on the beam forming a groove and securing a horizontal motion of the sweeps and a steady operation of the saws.

P is the follower to which the dogs are attached, which secures the block from which the staves are cut, and is moved up by a rack and pinion or such other machinery as is in common use in shingle and other mills.

I do not claim as my invention the form of the saws employed in this machine, nor do I claim the sawing of the staves from each end toward the middle.

What I do claim as my invention and desire to secure by Letters Patent is—

The giving to each of the saws a curvilinear reciprocating motion, in the manner and for the purpose herein described.

HART PEPPER.

Witnesses:
Jos. M. Forward,
Moses Loomis.